United States Patent [19]

Yoneda et al.

[11] Patent Number: 4,539,865
[45] Date of Patent: Sep. 10, 1985

[54] TRANSMISSION HOUSING ARRANGEMENT

[75] Inventors: Tetsuzo Yoneda, Toyota; Masanori Sato, Nagoya, both of Japan

[73] Assignees: Toyota Jidosha Kabushiki Kaisha; Aisin Seiki Kabushiki Kaisha, both of Aichi, Japan

[21] Appl. No.: 395,709

[22] Filed: Jul. 6, 1982

[30] Foreign Application Priority Data

Jul. 13, 1981 [JP] Japan ............... 56-103563[U]

[51] Int. Cl.³ ............................................. F16H 57/04
[52] U.S. Cl. ................................................. 74/606 R
[58] Field of Search .................... 74/606 R, 606 A; 210/222

[56] References Cited

U.S. PATENT DOCUMENTS

| 863,556 | 8/1907 | Priest et al. | 74/606 X |
| 2,105,742 | 1/1938 | Lee | 74/606 X |
| 2,574,986 | 11/1951 | Schou | 74/606 X |
| 2,968,190 | 1/1961 | Orr | 74/606 X |
| 2,984,122 | 5/1961 | Woolley | 74/606 R |
| 3,234,808 | 2/1966 | Nelson | 74/606 X |
| 3,463,729 | 8/1969 | Bean | 210/222 X |
| 3,800,914 | 4/1974 | Miyata | 210/222 X |
| 4,050,611 | 9/1977 | Frantz | 210/222 X |
| 4,367,661 | 1/1983 | Moroto et al. | 74/606 X |
| 4,422,933 | 12/1983 | Suerre et al. | 210/222 |

FOREIGN PATENT DOCUMENTS

| 1812232 | 12/1969 | Fed. Rep. of Germany | 74/606 R |
| 54-65258 | 5/1979 | Japan | 74/606 R |

Primary Examiner—Gary L. Smith
Assistant Examiner—Rodney M. Lindsey
Attorney, Agent, or Firm—Parkhurst & Oliff

[57] ABSTRACT

A transmission housing arrangement accommodates a plurality of meshing gears and comprises a main housing accommodating a part of meshing gears, an extension housing connected to the main housing and accommodating other meshing gear, and an intermediate plate partitioning the extension housing from the main housing and having a through hole at a lower portion of the intermediate plate for communicating the extension housing to the main housing, wherein the extension housing comprises a bottom wall defining a room under the meshing gear in the extension housing and a lubricating oil passage from the through hole to the room, the lubricating oil passage so curved that a flow of the lubricating oil into said extension housing is limited, whereby the meshing gear in the extension housing is prevented from sweeping up to much lubricating oil.

2 Claims, 5 Drawing Figures

TRANSMISSION HOUSING ARRANGEMENT

BACKGROUND OF THE INVENTION

The present invention relates to a transmission housing arrangement of a transmission in an automobile, and particularly to a transmission housing arrangement comprising a main housing accommodating a plurality of meshing gears and an extension housing accommodating the additional meshing gears. The present invention relates for example to a transmission housing arrangement of a multi-speed transmission.

In conventional transmission housings of this type, a main housing contains some of the meshing gears, of the transmission and an extension housing connected to the main housing contains the additional meshing gears of the transmission. An intermediate plate is used to partition the extension housing from the main housing. The intermediate plate has a through hole at a lower portion thereof for connecting the extension housing to the main housing. In this way, lubricating oil in the main housing can be introduced through the through hole into the extension housing and lubricating oil in the extension housing can be drained through the through hole into the main housing. A space is provided under the meshing gear in the extension housing communicates with the through hole so the lubricating oil flows smoothly between the through hole and the space under the meshing gear in the extension housing. Problems occur in transmission systems of this type because as the meshing gear in the extension housing rotates, it tends to sweep lubricating oil up toward the gears. Since there is a smooth flow between the through hole and the room under the meshing gear a large amount of lubricating oil flows from the main housing into the extension housing. As a result, if only a normal amount of lubricating oil is filled into the transmission housing, the meshing gears in the main housing will lack the required amount of lubricating oil resulting in a poor transmission efficiency. On the other hand, if an excessive amount of lubricating oil is filled into the extension housing, (i.e. when too much oil is filled into the transmission housing) fluid friction between the meshing gears in the extension housing and the lubricating oil will also lower the transmission efficiency.

SUMMARY OF THE INVENTION

Therefore, the object of the present invention is to provide a transmission housing arrangement which minimizes the sweep up of lubricating oil by the meshing gears in the extension housing.

According to the present invention, a transmission housing contains a plurality of meshing gears and comprises a main housing and an extension housing. The main housing contains some of the meshing gears and an extension housing connected to the main housing contains the additional meshing gears. An intermediate plate is provided to partition the extension housing from the main housing and the plate includes a through hole at the lower portion thereof for connecting the extension housing to the main housing. The extension housing additionally, comprises a bottom wall for defining a space under the meshing gear contained in the extension housing and a lubricating oil passage from the through hole to the space. The lubricating oil passage is designed to be so curved that the flow of lubricating oil into the extension housing is limited. This will prevent the meshing gears in the extension housing from sweeping up too much lubricating oil.

DETAILED DESCRIPTION OF THE INVENTION

Hereinafter, preferred embodiments of the present invention are explained in connection with the drawings.

Figure 1:
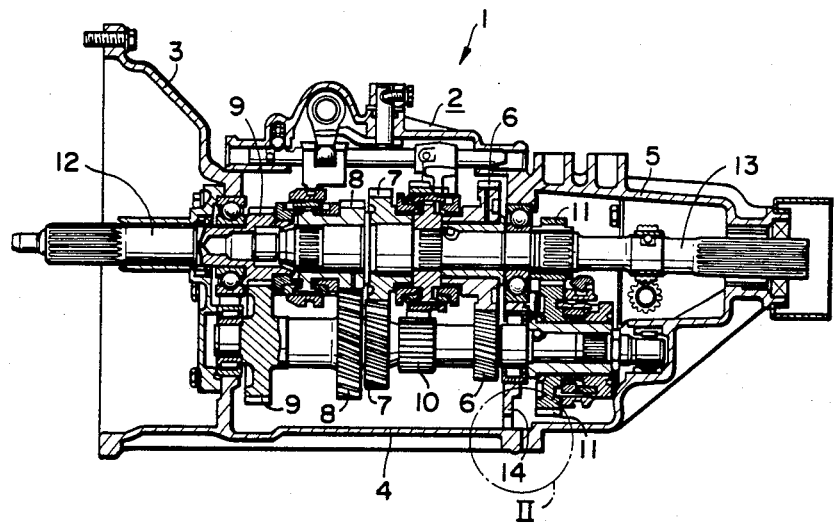
FIG. 1 is a longitudinal sectional view of a first embodiment of a transmission housing arrangement according to the present invention.

Referring to FIG. 1, a five-speed transmission 1 of the present is shown with first-speed, second-speed, third-speed, fourth-speed, fifth-speed and reverse positions. The transmission 1 has a transmission housing 2 containing a clutch housing 3, a main housing 4 and an extension housing 5. The main housing contains first-speed meshing gears 6, second-speed meshing gears 7, third-speed meshing gears 8, fourth-speed meshing gears 9 and reverse-meshing gears 10. The extension housing 5 contains the fifth-speed meshing gears 11. Furthermore, the transmission housing 2 supports an input shaft 12 and an output shaft 13.

Figure 2:
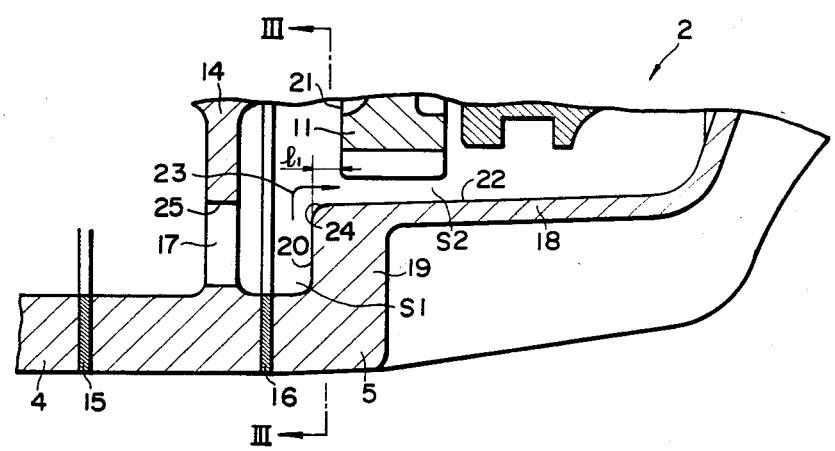
FIG. 2 is an enlarged view of "portion II" in FIG. 1.
Figure 3:
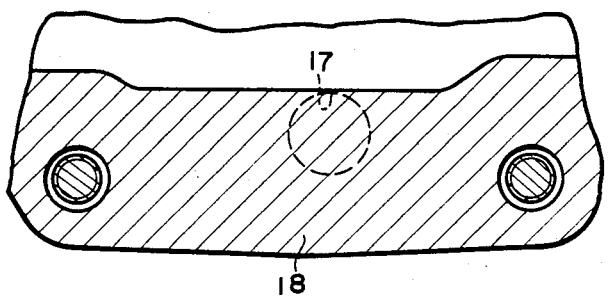
FIG. 3 is a sectional view along a line III—III in FIG. 2.

As shown at portion II of FIG. 1, and FIGS. 2 and 3, the main housing 4 and the extension housing 5 are partitioned by an intermediate plate 14. A juncture of main housing 4 and intermediate plate 14 is sealed by a packing 15. Additionally, a juncture of extension housing 5 and intermediate plate 14 is sealed by a packing 16. The intermediate plate 14 has at its lower portion a through hole 17, which introduces lubricating oil from the main housing 4 into extension housing 5 and drains lubricating oil from extension housing 5 into main housing 4.

The extension housing 5 contains a bottom wall 18 which includes a vertical portion 19 standing against through hole 17; the vertical portion 19 has a vertical surface 20 that faces through hole 17 of intermediate plate 14 to define a space $S_1$ between through hole 17 and vertical surface 20. A lower gear of the fifth-speed meshing gears 11 has a vertical surface 21 facing intermediate plate 14, and the distance between vertical surface 21 and intermediate plate 14 is longer by a distance $L_1$ than the distance between vertical surface 20 and intermediate plate 14. The bottom wall 18 further includes a substantially horizontal surface 22 facing the lower gear of meshing gears 11 and the horizontal surface 22 faces lower gear 11 to define a space $S_2$ between lower gear 11 and horizontal surface 22. In this arrangement, bottom wall 18 includes a step portion defined by vertical surface 20 and horizontal surface 22 which continuously extends from the top of the vertical surface.

Since vertical surface 20 is closer than vertical surface 21 by a distance $l_1$ to intermediate plate 14, a lubricating oil passage 23 is defined by bottom wall 18 for connecting spaces $S_1$ and $S_2$. These spaces are perpendicularly curved so that the pressure-loss in the lubricating oil flow is increased in comparison to the conventional transmission housing. Accordingly, when the fifth-speed meshing gears 11 sweep up lubricating oil, the lubricating oil which flows from space $S_1$ to space $S_2$ is diminished. This minimizes the lubricating oil flow from the main housing 4 into the extension housing 5. Therefore, the main housing 4 never depletes its supply of lubricating oil obviating the need to excessively fill the transmission housing with lubricating oil.

The horizontal surface 22 is close enough to the lower gear of the additional meshing gears 11 to make the space $S_2$ sufficiently small, so that the sweep up of lubricating oil by lower gear 11 is minimized. Also from this viewpoint, the lubricating oil flow from the main housing 4 into the extension housing 5 is restrained.

The substantially horizontal surface 22 is slightly inclined downwardly toward the intermediate plate 14, and a juncture 24 of surfaces 20 and 22 is shaped into a smooth convex surface. As a result of this, the lubricating oil in the extension housing 5 readily drains into the main housing.

It is understood that the higher the vertical surface 20 is, the more the pressure-loss in the lubricating oil passage 23 increases. The space $S_2$ should be of enough volume not to increase the fluid friction between the lower gear of the additional meshing gears 11 and the lubricating oil. In order to minimize the height of the transmission housing, to make the room $S_2$ of enough volume and to increase the pressure-loss in the lubricating oil passage 23, the juncture 24 should be positioned substantially at the same height as an upper inner surface 25 of the through hole 17.

Figure 4:
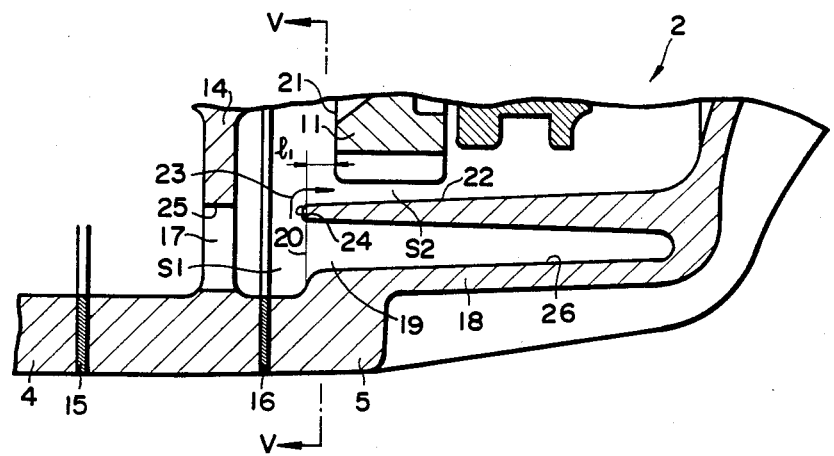
FIG. 4 is an enlarged longitudinal sectional view of a second embodiment of the present invention.
Figure 5:
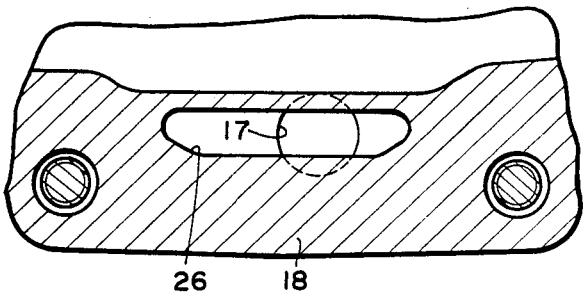
FIG. 5 is a sectional view along a line V—V in FIG. 4.

FIGS. 4 and 5 illustrate a second embodiment of the present invention.

In this embodiment, the bottom wall 18 further defines a recess 26 opening toward the through hole 17. Dust, which may be included in the lubricating oil, flows into recess 26 rather than following the lubricating oil passage 23 due to relatively great momentum of the dust. Since the inside of recess 26 is a stagnation point of flow, the dust within recess 26 never flows out. Therefore, the dust cannot get in between the teeth of additional meshing gears 11 which protects the gears from injury and abrasion.

To catch ferromagnetic dust contained within the lubricating oil, a magnet 27 is provided at recess 27.

While the invention has been described in detail and with reference to specific embodiments thereof, it will be apparent to one skilled in the art that various changes and modifications can be made therein without departing from the spirit and scope thereof.

What is claimed is:

1. A transmission housing arrangement for accommodating a plurality of meshing gears comprising:
   a main housing accommodating at least one of said plurality of meshing gears;
   an extension housing connected to said main housing and accommodating the remainder of said plurality of meshing gears;
   an intermediate plate partitioning said extension housing and said main housing, said intermediate plate having a vertical plane and defining a through hole at a lower portion thereof, said through hole establishing fluid communication between said extension housing and said main housing;
   a bottom wall defined by said extension housing, said bottom wall defining a recess having a first surface and a second surface, said first surface being elevated with respect to said second surface, a first end of said first surface being connected to a first end of said second surface, a second end of said first surface and a second end of said second surface facing said intermediate plate, said through hole and said recess defining an oil passage;
   a substantially vertical plane through said second end of said first surface and said second end of said second surface being closer to the vertical plane of said intermediate plate than any vertical plane through said remainder of said plurality of meshing gears;
   whereby said first surface restricts fluid flow to the vicinity of said remainder of said plurality of meshing gears, thereby minimizing sweeping up of lubricant from said remainder of said plurality of meshing gears.

2. The transmission housing arrangement of claim 1, wherein said recess is opposite to said through hole.

* * * * *